US009679045B2

(12) United States Patent
He et al.

(10) Patent No.: US 9,679,045 B2
(45) Date of Patent: Jun. 13, 2017

(54) ESTABLISHING AND QUERYING METHODS OF KNOWLEDGE LIBRARY ENGINE BASED ON EMERGENCY MANAGEMENT

(71) Applicant: CLOUD COMPUTING CENTER CHINESE ACADEMY OF SCIENCES, DongGuan, Guangdong (CN)

(72) Inventors: Zhongtang He, Guangdong (CN); Xinan Li, Guangdong (CN); Fengwei Zhao, Guangdong (CN); Zhiyong Li, Guangdong (CN)

(73) Assignee: CLOUD COMPUTING CENTER CHINESE ACADEMY OF SCIENCES, DongGuan, Guangdong (CN)

( * ) Notice: Subject to any disclaimer, the term of this patent is extended or adjusted under 35 U.S.C. 154(b) by 325 days.

(21) Appl. No.: 14/398,468

(22) PCT Filed: Dec. 27, 2012

(86) PCT No.: PCT/CN2012/087688
§ 371 (c)(1),
(2) Date: Nov. 2, 2014

(87) PCT Pub. No.: WO2014/094332
PCT Pub. Date: Jun. 26, 2014

(65) Prior Publication Data
US 2015/0095331 A1   Apr. 2, 2015

(30) Foreign Application Priority Data

Dec. 21, 2012  (CN) .......................... 2012 1 0564332

(51) Int. Cl.
*G06F 7/00* (2006.01)
*G06F 17/30* (2006.01)
(Continued)

(52) U.S. Cl.
CPC .... *G06F 17/30634* (2013.01); *G06F 17/2276* (2013.01); *G06F 17/30699* (2013.01);
(Continued)

(58) Field of Classification Search
CPC ......... G06F 17/30707; G06F 17/30634; G06F 17/302276; G06F 17/30699; G06F 17/22
USPC ................................................ 709/225, 231
See application file for complete search history.

(56) References Cited

U.S. PATENT DOCUMENTS

| 6,789,057 B1 * | 9/2004 | Morimoto | ............. G06F 17/271 704/2 |
| 7,716,037 B2 * | 5/2010 | Precoda | ................ G06F 17/289 704/2 |

(Continued)

*Primary Examiner* — Daniel Kuddus

(57) ABSTRACT

An establishing method of a knowledge library engine based on emergency management includes steps of extracting relevant data from unstructured text information, filtering out unwanted data and improving a structure of the relevant data, so as to ensure homogeneity of the relevant data; structurally analyzing a text content of obtained information, extracting a feature thereof and storing the feature in the feature library as a key word of a knowledge; and processing the obtained information with the automatic word segmentation module, then classifying a result according to an information classification standard, and establishing an association of the knowledge and information classification. A querying method of the knowledge library engine based on emergency management includes steps of: understanding semanteme, understanding knowledge, and querying knowledge.

2 Claims, 4 Drawing Sheets

(51) Int. Cl.
  *G06Q 10/06* (2012.01)
  *G06Q 10/10* (2012.01)
  *G06F 17/22* (2006.01)
  *G06N 5/02* (2006.01)

(52) U.S. Cl.
  CPC ....... *G06F 17/30707* (2013.01); *G06Q 10/06* (2013.01); *G06Q 10/10* (2013.01); *G06N 5/02* (2013.01)

(56) References Cited

U.S. PATENT DOCUMENTS

| | | | | |
|---|---|---|---|---|
| 7,716,056 | B2* | 5/2010 | Weng | G06F 17/278 704/10 |
| 8,510,328 | B1* | 8/2013 | Hatton | G06F 17/2795 706/45 |
| 2004/0153311 | A1* | 8/2004 | Liu | G06F 17/2735 704/10 |
| 2005/0246160 | A1* | 11/2005 | Zimmermann | G05B 19/41865 704/9 |
| 2009/0248671 | A1* | 10/2009 | Maruyama | G06F 17/30707 |
| 2011/0060712 | A1* | 3/2011 | Harashima | G06F 17/30684 706/47 |
| 2012/0117053 | A1* | 5/2012 | Bobick | G06F 17/2795 707/710 |
| 2012/0303664 | A1* | 11/2012 | Apacible | G06F 17/30654 707/780 |
| 2012/0324112 | A1* | 12/2012 | Dow | G06F 9/5077 709/226 |
| 2013/0198228 | A1* | 8/2013 | Choi | G06F 17/30864 707/769 |

* cited by examiner

ESTABLISHING AND QUERYING METHODS OF KNOWLEDGE LIBRARY ENGINE BASED ON EMERGENCY MANAGEMENT

CROSS REFERENCE OF RELATED APPLICATION

This is a U.S. National Stage under 35 U.S.C 371 of the International Application PCT/CN2012/087688, filed Dec. 27, 2012, which claims priority under 35 U.S.C. 119(a-d) to CN 201210564332.3, filed Dec. 21, 2012.

BACKGROUND OF THE PRESENT INVENTION

Field of Invention

The present invention relates to a technical field of urban comprehensive emergency management, and more particularly to establishing and querying methods of a knowledge library engine based on emergency management.

Description of Related Arts

With rapid development of city and application of modem science as well as technology, urban systems become increasingly complex, and comprehensive risk is increasing. Especially, in recent years, natural disasters and man-made disasters occur frequently, which greatly threaten city security. Therefore, how to strengthen urban security mechanism, and timely as well as effectively respond to possible emergencies at any time, is a major issue urging solution. Improving modernization of government functions by informationalized methods has been commonly accepted by government. In a field of emergency management, various urban comprehensive emergency management platforms have been designed. With the emergency platform, management of different industries are centrally managed and commanded, in such a manner that information is interoperable and shared, treatment process is more standardized, and emergency response capabilities of government are effectively improved.

Referring to knowledge library platforms, there are: web knowledge libraries which cover a wide range of fields and are universal, such as Baidu library and Douding net; professional knowledge libraries, such as KMPRO knowledge management platform and CYC massive knowledge library; and some specialized knowledge libraries such as mechanical design knowledge library, troubleshooting knowledge library, papers and professional field knowledge library. Such knowledge libraries cover various fields. With different knowledge representation and different industries, forming method of the knowledge platform, querying and using methods of information are greatly different. Advantages of the knowledge libraries are that a huge storage capacity of knowledge is provided, and efficient query is formed. Defects thereof are establishing of the knowledge, especially immature classified storage and accurate query of the knowledge. Furthermore, due to the establishing defects, intelligent query is not able to be provided.

SUMMARY OF THE PRESENT INVENTION

A first object of the present invention is to provide an establishing method of a knowledge library engine based on emergency management, wherein according to characteristics of an emergency knowledge library, standard emergency classification criteria and elements are utilized for classifying and structuring the emergency knowledge library; and a type library is established in accordance with a classification algorithm, in such a manner that a structure of classified data is more consummated, a covering range of information is wider, and professionalization of the emergency management is better satisfied.

A second object of the present invention is to provide a querying method of a knowledge library engine based on emergency management, wherein by using specific dictionaries such as a synonym dictionary and a type word dictionary established according to emergencies, intelligent classified query of information is provided with a combination of a feature library and a type library; query results thereof are more accurate, display thereof is more friendly.

Accordingly, in order to accomplish the first object, the present invention provides an establishing method of a knowledge library engine based on emergency management, comprising a step of:

dividing an application frame into an application layer, an application supporting layer, a data layer, and a basic supporting layer;

wherein the application layer comprises an information input module and an information query module;

wherein the application supporting layer comprises an information extraction module, an automatic word segmentation module, a classification module, a semantic understanding module, a knowledge understanding module, and a knowledge query module;

wherein the data layer comprises a knowledge library, a feature library, and a type library; the data layer further comprises a synonym dictionary and a type word dictionary; and wherein the basic supporting layer comprises a distributed database, a storage device, a server, an application workstation, a network, an operation system, and a middleware; wherein the middleware is placed on a heterogeneous hardware platform and an operation system platform for shielding difference of the heterogeneous hardware platform and the operation system platform, and providing services such as load balancing, transaction management and reliable messaging for an up-layer application.

Preferably, the establishing method further comprises steps of:

extracting relevant data from unstructured text information, filtering out unwanted data and improving a structure of the relevant data, so as to ensure homogeneity of the relevant data;

structurally analyzing a text content of obtained information, extracting a feature thereof and storing the feature in the feature library as a key word of a knowledge;

processing the obtained information with the automatic word segmentation module, then classifying a result according to an information classification standard, and establishing an association of the knowledge and information classification; and matching a mode during a user information query with the feature library and the type library; analyzing an information query log, then finding out a user behavior habit, and feeding back to the information input module.

Preferably, the establishing method further comprises a step of: during information extracting, separating a natural language with a binary tree, and treating a synonym with the synonym dictionary.

Accordingly, in order to accomplish the second object, the present invention provides a querying method of a knowledge library engine, comprising steps of:

understanding semanteme, understanding knowledge, and querying knowledge;

wherein the step of understanding semanteme specifically comprises steps of: extracting core words which form a sentence with an intelligent segmentation technique, for being used by a semantic analyzing module; during word segmentation, firstly dividing the whole sentence into clauses according to punctuation; then dividing the clauses into words according to character lengths; and comparing a traversed word with a word in a dictionary library, wherein if the traversed word appears in a dictionary, extracting the traversed word; if the traversed word does not appear in a dictionary, filtering off the word as redundancy information;

wherein the step of understanding knowledge specifically comprises a step of: automatically associating a synonym with the word extracted during the step of understanding semanteme by utilizing a synonym dictionary, so as to query a key word in a feature library with the synonym, for providing query results with high accuracy, high relativity and high comprehensiveness to a user question; and wherein the step of querying knowledge specifically comprises steps of: querying the key word and querying a type; wherein the step of querying the key work specifically comprises a step of: querying the feature library according to the synonym dictionary, so as to find out related knowledge; the step of querying a type specifically comprises a step of: determining a type of the knowledge according to a relationship of the knowledge and types, wherein detailed knowledge information found out by understanding the knowledge is classified into a specific type mainly according to structural association of the knowledge library, so as to clearly display information to a user.

Preferably, the querying method further comprises a step of: establishing a user information feedback mechanism in a query system, for finding out user information, wherein the user evaluates and scores according to the query results obtained, information judgment depends on a scoring result.

According to the present invention, the knowledge library is established based on the emergency management. According to characteristics of an emergency knowledge library, the synonym dictionary and the type word dictionary proper to the emergency management are formed. According to an event classification standard and a knowledge classified treatment method, the knowledge library of the emergency management is effectively established, and functions such as rapid information query are provided.

These and other objectives, features, and advantages of the present invention will become apparent from the following detailed description, the accompanying drawings, and the appended claims.

BRIEF DESCRIPTION OF THE DRAWINGS

Referring to the drawings, the present invention is further illustrated.

DETAILED DESCRIPTION OF THE PREFERRED EMBODIMENT

A knowledge library engine based on emergency management is an application platform which is guided by an emergency management industry and is able to collect industry knowledge, form solutions, rapidly obtain knowledge, and provide knowledge library establishment, update, maintenance, management, and utilization. An application mode according to the present invention is different from an application mode of the conventional knowledge library platform. Analyzing and implementing are specifically provided for a field of the emergency management, in such a manner that sharing and reusing of the knowledge library of such field are maximized, and a core value of the knowledge library of such field is more effectively used in a larger range.

Figure 1:
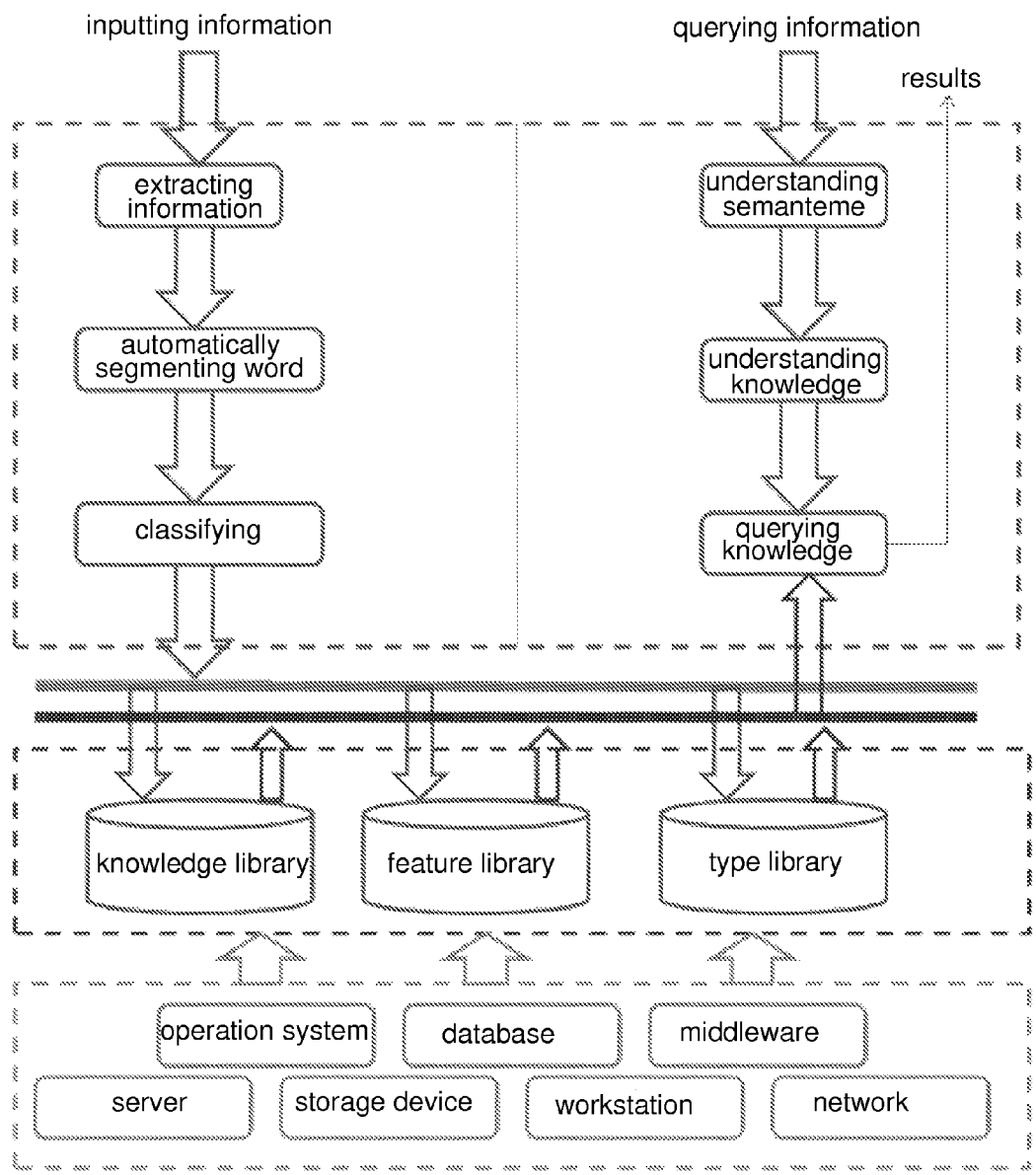
FIG. 1 shows an overall frame of a knowledge library engine based on emergency management according to a preferred embodiment of the present invention.

Referring to FIG. 1, according to the present invention, an application frame of the knowledge library engine has 4 layers, namely an application layer, an application supporting layer, a data layer, and a basic supporting layer.

According to a design of the knowledge library engine, the application layer comprises an information input module and an information query module. Information input is a source for establishing a knowledge library, and information query is a detailed application of the knowledge library.

The application supporting layer comprises an information extraction module, an automatic word segmentation module, a classification module, a semantic understanding module, a knowledge understanding module, and a knowledge query module.

The data layer comprises a knowledge library, a feature library, and a type library. The data layer further comprises a synonym dictionary and a type word dictionary.

The basic supporting layer comprises a distributed database, a storage device, a server, an application workstation, a network, an operation system, and a middleware. The middleware is placed on a heterogeneous hardware platform and an operation system platform for shielding difference of the heterogeneous hardware platform and the operation system platform, and providing services such as load balancing, transaction management and reliable messaging for an up-layer application.

Figure 2:
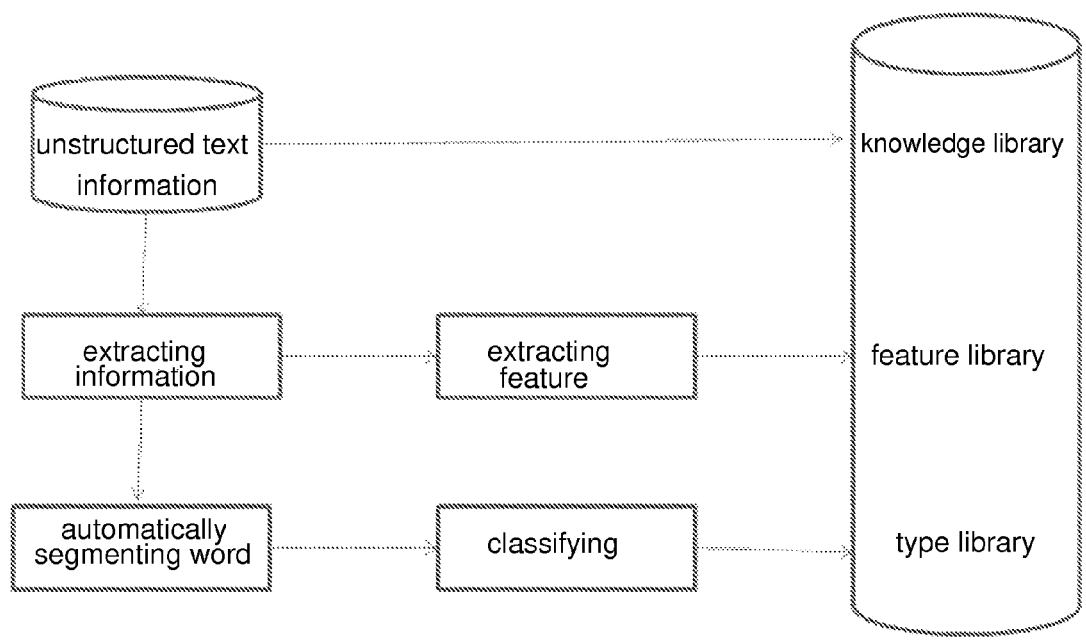
FIG. 2 is a structural view of an emergency knowledge library according to the preferred embodiment of the present invention.

Referring to FIG. 2, during establishing of the knowledge library, the information input is one of cores of the knowledge library engine based on the emergency management, a data source of the knowledge library, and a foundation for establishing an effective knowledge application which means information query. Information query results and an intelligent degree thereof depend on quality of the information input.

There is no general standard for the emergency knowledge library. Few of the knowledge are structured texts, and most of the knowledge are unstructured texts. For standardized description, useful information should be extracted from mass unstructured text information and analyzed, so as to form a structured and associated knowledge library in a database. Extracting information comprises steps of: extracting relevant data from unstructured text information, filtering off unwanted data and improving a structure of the relevant data, so as to ensure homogeneity of the relevant data.

Understanding of natural language is a key for extracting information, and comprises steps of: during information extracting, separating a natural language with a binary tree, and treating a synonym with the synonym dictionary.

For example, treating a sentence of "at 4:31 on Apr. 9, 2012, Dongguan Jianhui Paper Co. which is located in Zhongtang town Dongguan city was on fire" comprises steps of:

firstly dividing the whole sentence into two clauses, "at 4:31 on Apr. 9, 2012" and "Dongguan Jianhui Paper Co. which is located in Zhongtang town Dongguan city was on fire" according to punctuation; then traversing for obtaining notional words such as "Zhongtang town", "Dongguan", "Jianhui Paper Co." and "fire"; and comparing a traversed word with a word in a dictionary, wherein if the traversed word appears in the dictionary, extracting the traversed word; if the traversed word does not appear in the dictionary, filtering off the traversed word;

structurally analyzing a text content of obtained information, extracting a feature thereof and storing the feature in the feature library as a key word of a knowledge; and processing the obtained information with the automatic word segmentation module, then classifying a processing result, and establishing an association of the knowledge and information classification. Classification of information is based on an emergency classification standard comprising 4 types, 44 sub-types and more than 320 secondary sub-types. From the obtained information, "fire" belongs to a type of accident according to comparison.

With the above treatment, the information is classified and key word feature information is established, which support efficient information query.

Furthermore, establishment of the feature library and the type library is for matching a mode during a user information query. By analyzing an information query log, a user behavior habit is found out and fed back to the information input module, for continuously learning and improving.

Figure 3:
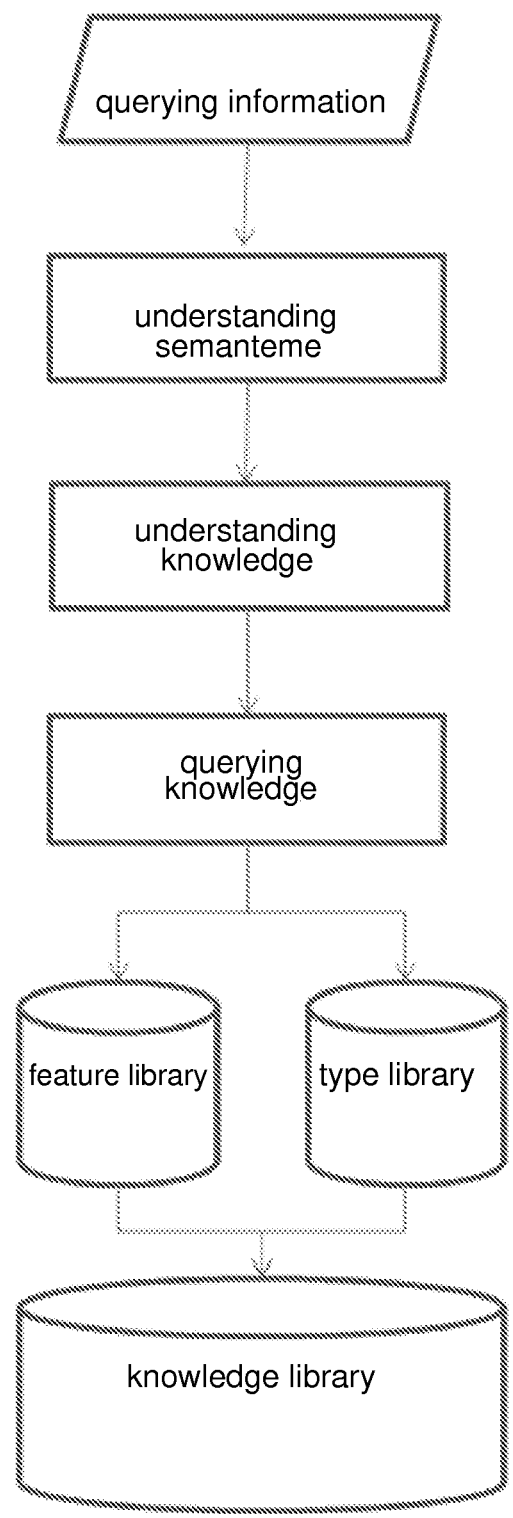
FIG. 3 is a flow chart of querying the emergency knowledge library according to the preferred embodiment of the present invention.

Referring to FIG. 3, emergency knowledge library query is illustrated.

An information query interface provides a simple query interface and a complex query interface. Results thereof are displayed as a list type and an information summary type. The complex query interface interacts with the natural language, in such a manner that information obtained is more accurate. Displaying by the information summary type is conducive to information comparison by the user. Especially, emergencies are normatively and clearly classified, and the results are displayed as the information summary type based on the emergency classification standard, so as to clearly sum up and gather the information.

An intelligent querying method comprises steps of: understanding semanteme, understanding knowledge, and querying knowledge, wherein a knowledge library is a foundation and a core for intelligent query. The knowledge library provides a result which needs to be provided to the user in the end of semanteme understanding.

During semanteme understanding, intelligent segmentation technique forms an initial link, which comprises steps of: extracting core words which form a sentence for being used by a semantic analyzing module; during word segmentation, firstly dividing the whole sentence into clauses according to punctuation; then dividing the clauses into words according to character lengths; and comparing a traversed word with a word in a dictionary library, wherein if the traversed word appears in a dictionary, extracting the traversed word; if the traversed word does not appear in a dictionary, filtering off the word as redundancy information.

Synonym dictionary is utilized during knowledge understanding, wherein the step of understanding knowledge specifically comprises a step of: automatically associating a synonym of the word extracted during the step of understanding semanteme with a synonym dictionary, so as to provide a key word query in a feature library with the synonym, for providing query results with high accuracy, high relativity and high comprehensiveness to a user question.

The step of querying knowledge specifically comprises steps of: querying a key word and querying a type; wherein the step of querying a key work specifically comprises a step of: querying the feature library according to the synonym dictionary, so as to find out related knowledge. The step of querying a type specifically comprises a step of: determining a type of the knowledge according to a relationship of the knowledge and types. Association information of the knowledge and classification is established during the information input, and is stored in the type library.

During querying the type, the knowledge is classified into a specific type with understanding the knowledge and detailed knowledge obtained, mainly according to structural association of the knowledge library, so as to clearly display information to a user.

A user information feedback mechanism is established in a query system, for finding out user information, wherein the user evaluates and scores the query results obtained, information judgment depends on a scoring result.

Figure 4:
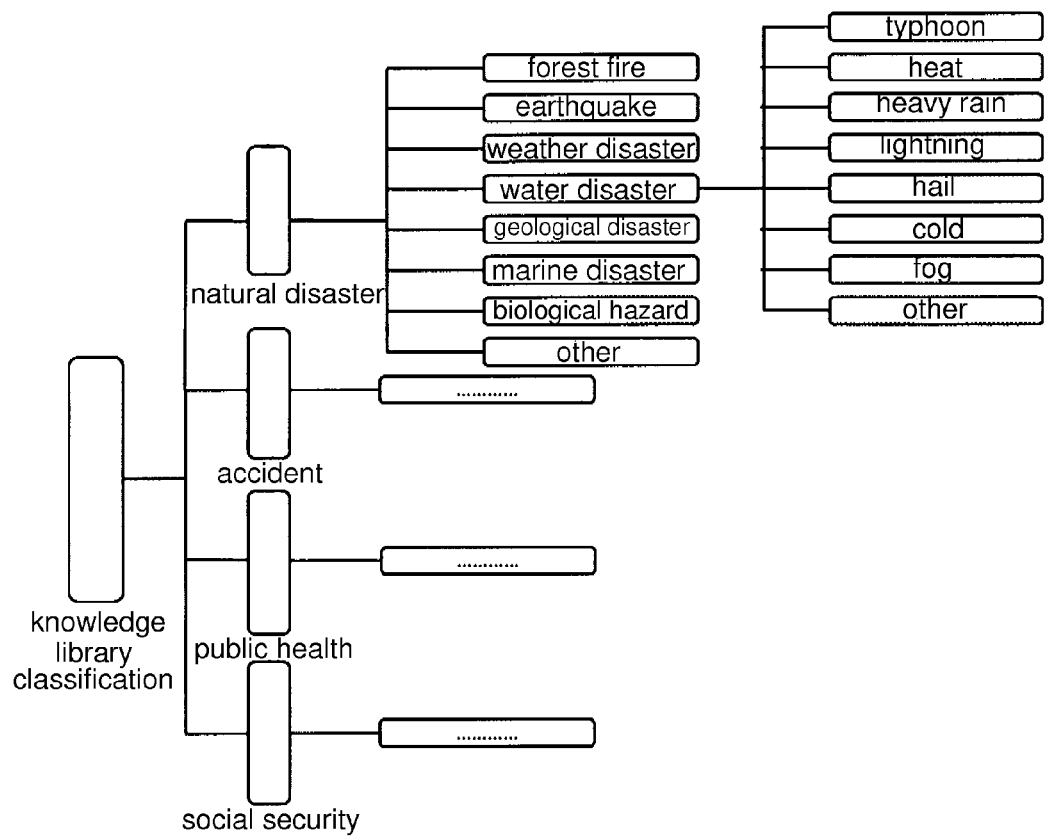
FIG. 4 is a classification map of the emergency knowledge library according to the preferred embodiment of the present invention.

Referring to FIG. 4, a classification map of the knowledge library according to the present invention is illustrated.

According to knowledge types, the knowledge library of emergency management is divided into 3 layers, 4 types, 44 sub-types, and more than 320 secondary sub-types. A first layer comprises natural disasters, accidents, public health, and social security. A second layer comprises subdivided types of the first layer. For example, the natural disasters comprise forest fires, earthquakes, weather disasters, geological disasters, marine disasters, water disasters and biological hazards. A third layer comprises subdivided types of the second layer. For example, the water disasters comprise typhoons, heat, heavy rain, lightning, hail, cold, and fog.

According to key factors, emergencies are classified into definition, causes, development laws, critical conditions, consequences of disasters, responses, typical cases, typical images, typical videos, typical hazard sources, corresponding emergency substances and equipments.

The classification has two stages of training and classifying. Training comprises steps of:

(1) establishing a type collection according to an emergency classification standard, wherein the type collection comprises 4 types, 44 sub-types, and more than 320 secondary sub-types;

(2) providing a training document collection, wherein the training document collection is obtained by extracting the knowledge library of emergency management; extraction is provided in line with a homogeneity principle and a diversity principle, which means that a certain quantity of documents is selected under each type, and the documents with the same type should be as different as possible; establishing an association library of the word and the type collection, namely a type library; and (3) counting appearance frequency of each word in the training document collection, and according to the appearance frequency, extracting feature vectors of all the documents in the training document collection.

Classifying comprises steps of:

(1) extracting a feature vector of each unclassified document in an unclassified document collection;

(2) calculating distance measures between the feature vector of the unclassified document and each type word, namely similarity; determining the type of the unclassified document according to the distance measures; and (3) selecting the type with the max similarity as a final type of the unclassified document.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A querying method of a knowledge library engine, comprising steps of:

understanding semanteme, understanding knowledge, and querying knowledge;

wherein the step of understanding semanteme specifically comprises steps of: extracting core words which form a sentence with an intelligent segmentation technique, for being used by a semantic analyzing module; during word segmentation, firstly dividing the whole sentence into clauses according to punctuation; then dividing the clauses into words according to character lengths; and comparing a traversed word with a word in a dictionary library, wherein when the traversed word appears in a dictionary, extracting the traversed word; when the traversed word does not appear in a dictionary, filtering off the word as redundancy information;

wherein the step of understanding knowledge specifically comprises a step of: automatically associating a synonym of the word extracted during the step of understanding semanteme with a synonym dictionary, then querying a key word in a feature library with the synonym, for providing query results with high accuracy, high relativity and high comprehensiveness to a user question; and wherein the step of querying knowledge specifically comprises steps of: querying the key word and querying a type; wherein the step of querying the key word specifically comprises a step of: querying the feature library according to the synonym dictionary, then finding out related knowledge; the step of querying a type specifically comprises a step of: determining a type of the knowledge, wherein detailed knowledge information found out by understanding the knowledge is classified mainly according to structural association of the knowledge library, for clearly displaying information to a user;

wherein the knowledge library engine is established by:

dividing an application frame into an application layer, an application supporting layer, a data layer, and a basic supporting layer;

extracting relevant data from unstructured text information, separating a natural language with a binary tree, and treating a synonym with the synonym dictionary; filtering off unwanted data and improving a structure of the relevant data, for ensuring homogeneity of the relevant data;

structurally analyzing a text content of obtained information, extracting a feature of the text content and storing the feature in the feature library as a key word of a knowledge;

processing the obtained information with the automatic word segmentation module, then classifying according to an information classification standard, and establishing an association of the knowledge and information classification; and matching a mode during a user information query with the feature library and the type library; analyzing an information query log, then finding out a user behavior habit, and feeding back to the information input module;

wherein the application layer comprises an information input module and an information query module;

wherein the application supporting layer comprises an information extraction module, an automatic word segmentation module, a classification module, a semantic understanding module, a knowledge understanding module, and a knowledge query module;

wherein the data layer comprises a knowledge library, a feature library, and a type library; the data layer further comprises a synonym dictionary and a type word dictionary; and wherein the basic supporting layer comprises a distributed database, a storage device, a server, an application workstation, a network, an operation system, and a middleware; wherein the middleware is placed on a heterogeneous hardware platform and an operation system platform for shielding difference of the heterogeneous hardware platform and the operation system platform, and providing services comprising load balancing, transaction management and reliable messaging for an up-layer application.

2. The querying method, as recited in claim 1, further comprising a step of: establishing a user information feedback mechanism in a query system, for finding out user information, wherein the user evaluates and scores according to the query results obtained, information judgment depends on a scoring result.

* * * * *